United States Patent [19]

Hagar, III et al.

[11] Patent Number: 4,914,686

[45] Date of Patent: Apr. 3, 1990

[54] CORDLESS PHONE DATA LOGGER

[76] Inventors: William G. Hagar, III, 28 Winchester St., Newton Highlands, Mass. 02161; Richard Volpicelli, 236 Grove St., Lexington, Mass. 02173

[21] Appl. No.: 935,738

[22] Filed: Nov. 28, 1986

[51] Int. Cl.$^4$ ............................................. H04Q 7/04
[52] U.S. Cl. ....................................... 379/61; 379/58; 379/63
[58] Field of Search ...................... 379/61, 58, 59, 57, 379/56; 128/903

[56] References Cited

U.S. PATENT DOCUMENTS

| | | | |
|---|---|---|---|
| 3,449,750 | 6/1969 | Sweigert | 379/61 |
| 4,100,536 | 7/1978 | Ball et al. | 340/207 R |
| 4,456,793 | 6/1984 | Baker et al. | 379/61 |
| 4,577,182 | 3/1986 | Millsap et al. | 340/539 |
| 4,593,273 | 6/1986 | Narcisse | 340/539 |
| 4,675,863 | 6/1987 | Paneth et al. | 370/50 |
| 4,688,244 | 8/1987 | Hannon et al. | 379/58 |
| 4,754,473 | 6/1988 | Edwards | 379/58 |
| 4,805,631 | 2/1989 | Roi du Maroc, II | 128/710 |

OTHER PUBLICATIONS

Formanek Article, Nov. 26, 1986.
Abstract by Barr and Hagar 126, Abstracts for the Eighth Biennial International Estuarine Research Conference.
Publication of Volpicelli, et al., Interactive Water Monitoring System Accessible by Cordless Telephone.

Primary Examiner—Robert Lev
Attorney, Agent, or Firm—Weingarten, Schurgin, Gagnebin & Hayes

[57] ABSTRACT

A remote data logging and telecommunication system utilizing a cordless telephone as a convenient two-way wireless link between a location of data collection and storage and a distant station. The distant station can command the data logging system to log, read or change logging protocols. Password and code word protection is available for the system.

26 Claims, 3 Drawing Sheets

CORDLESS PHONE DATA LOGGER

BACKGROUND OF THE INVENTION

Where it is desired to monitor environmental parameters in remote or hostile environments, such as the ocean or uninhabited terrain, it is known to use local recording of the sensed parameters. The recorded data may then be read out by the person collecting the data by occasional visits to the site to collect the recorded data. The need to make such occasional visits is inconvenient and may expose the collector to danger if the conditions at the recording site are hostile.

Systems utilizing data transmission from remote sites have in the past been costly and required special licensing of the transmitting facility.

A great simplification of the collection of remotely recorded data is found in a description of our presently claimed invention in INTERACTIVE WATER MONITORING SYSTEM ACCESSIBLE BY CORDLESS TELEPHONE, Review of Scientific Instruments, Vol. 56, No. 12, December 1985, incorporated herein by reference.

SUMMARY OF THE INVENTION

In accordance with the teaching of our invention, an interfacing system is provided to permit a low cost, already licensed cordless telephone (or Cellular telephone) to read to a base station data recorder at a remote logging system and to respond to base station signals to control the logging operation.

The interfacing system responds to ring signals from the cordless unit to trigger a modem in a local computer into answering and sending back an off-hook signal. The interfacing system responds to the off-hook signal and places the cordless unit into a transmit and receive state for the two-way exchange of data and commands between the computer and base station.

In this manner it is possible to locate the base station near a phone line while the remote logger and cordless unit may be some distance away from such facilities, including the coastal sea or harbors. A call can be placed from anywhere in the world to activate the remote unit and to receive information from it.

Alternatively, the base unit may be portable and need only get close to the remote logger by plane, boat or otherwise to permit the user to activate the remote readout of data to the base station.

The remote logger may be protected by password or other codes to prevent false activation using electronics available in commercial, inexpensive cordless telephones.

The base station can also issue commands interpreted by the remote logger to cause it to log data according to one or more selectable protocols.

DESCRIPTION OF THE DRAWING

These and other features of the invention are more fully described in the detailed description below and accompanying drawings of which.

DETAILED DESCRIPTION

Figure 1:
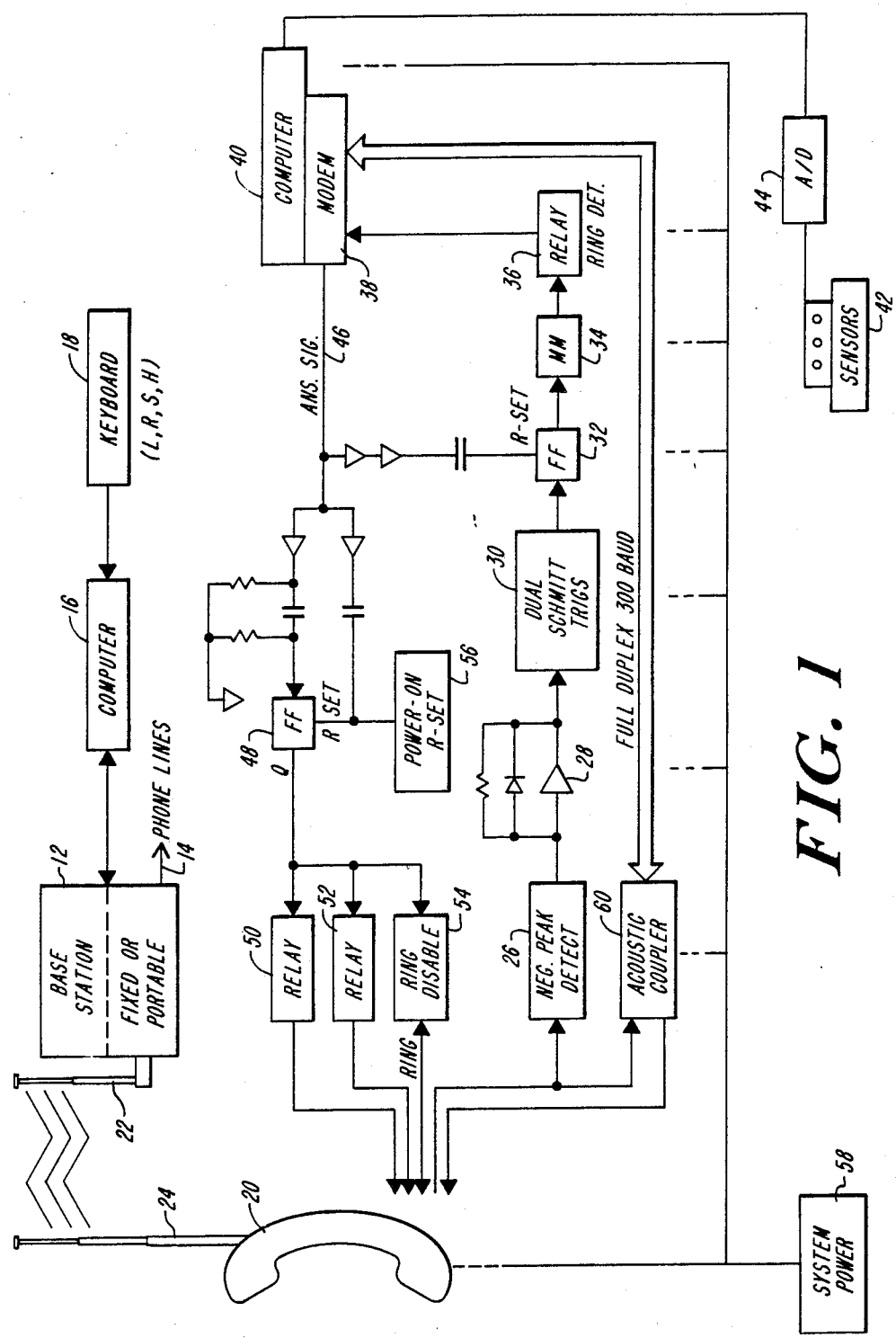
FIG. 1 is circuit diagram of the invention.

The present invention contemplates an interface system for enabling remote data logging and wireless read out of that data by use of low cost cordless telephone systems.

In particular, the invention utilizes a base station 12 which may be portable or fixed, and if fixed is typically connected to the telephone lines 14 for distant access to the system. A computer 16 typically provides data reception and command generation from a keyboard 18 at the base unit, distant station, or both.

The base station 12 communicates with a remote cordless telephone 20 through respective antennas 22 and 24. The cordless telephone 20 and base station 12 may be an AT and T Nomad 100 or other types of cordless phones or cellular phone. The cordless handset 20 has a ring signal output which is connected to a negative peak detector 26, amplifier and positive peak detector 28 and dual schmitt triggers 30 for signal shaping. The output of the triggers 30 sets a flip-flop 32 which in turn activates a 50 millisecond one-shot multivibrator 34 that closes contacts of a relay 36 that is used as an input to the autoanswer capability of a modem 38 associated with a computer 40 at the remote data logging site. Modem 38 and computer 40 may be an RCA 18S653 and 1805 respectively.

The computer 40 responds to signals from various environmental sensors 42 that sense such parameters as ocean salinity, oxygen and temperature. The analog outputs are converted in A-to-D converters 44 and the digized parameters are made available to the computer 40.

The modem 38 responds to the ring signal by emitting an off-hook signal in place of the normal on-hook signal on its answer signal line 46. This signal resets the flip-flop 32 and is applied to set and reset inputs of a further flip-flop 48 to respectively set and reset it in the off-hook and on-hook transitions. In the set state, the flip-flop 48 activates relays 50 and 52 that enable the transmit and receive capabilities of the cordless phone 20. A further relay 54 is activated by the flip-flop 48 to disable the ring circuit of the cordless telephone to suppress noise interference. The flip-flop 48 is reset at power on by a circuit 56. A remote system power source 58 may be battery or otherwise energized. When the cordless set is placed into the transmit and receive mode, an acoustic coupler 60 connects the modem's and telephone's full duplex signals. Other connection schemes including direct connection may be utilized with due regard to appropriate isolation needs.

Figure 2:
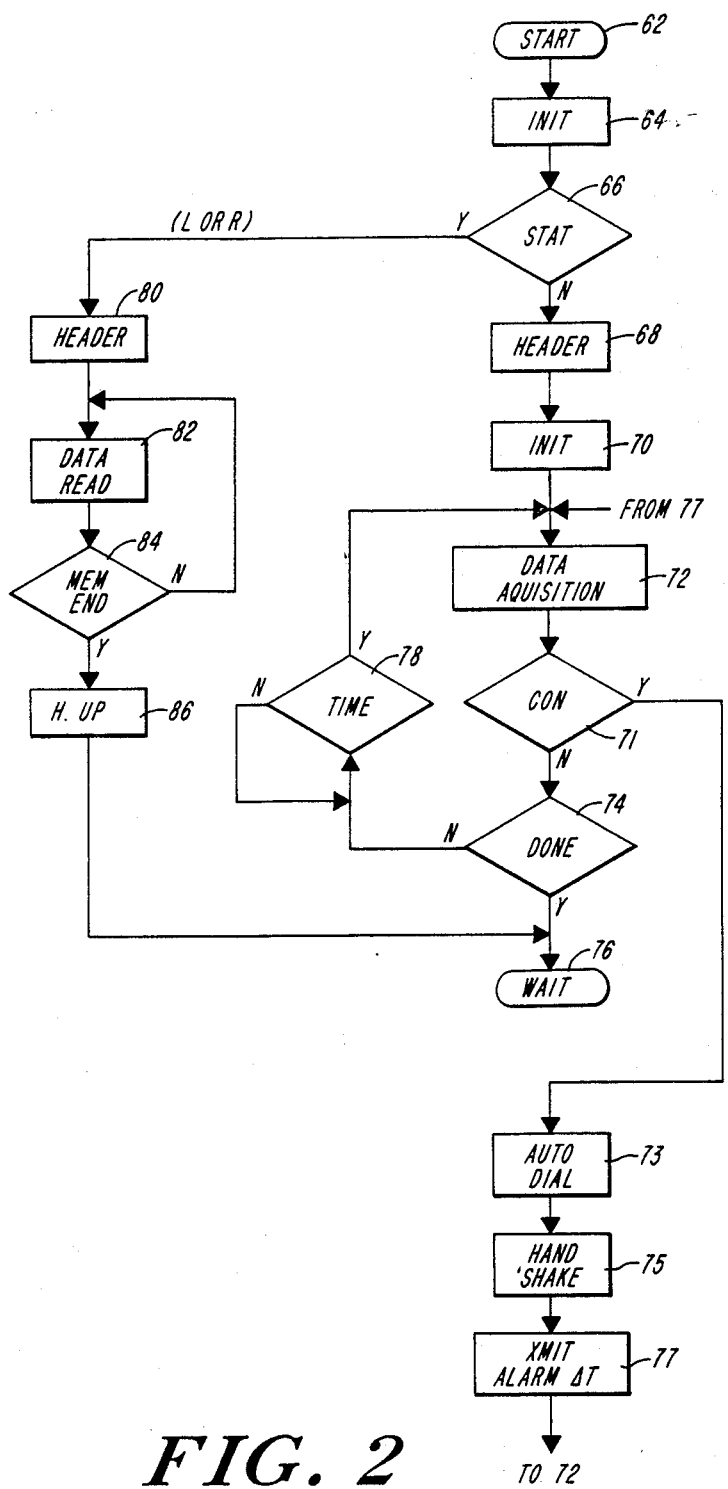
FIGS. 2 and 3 are flow charts describing the operation of the invention and data logger.
Figure 3:
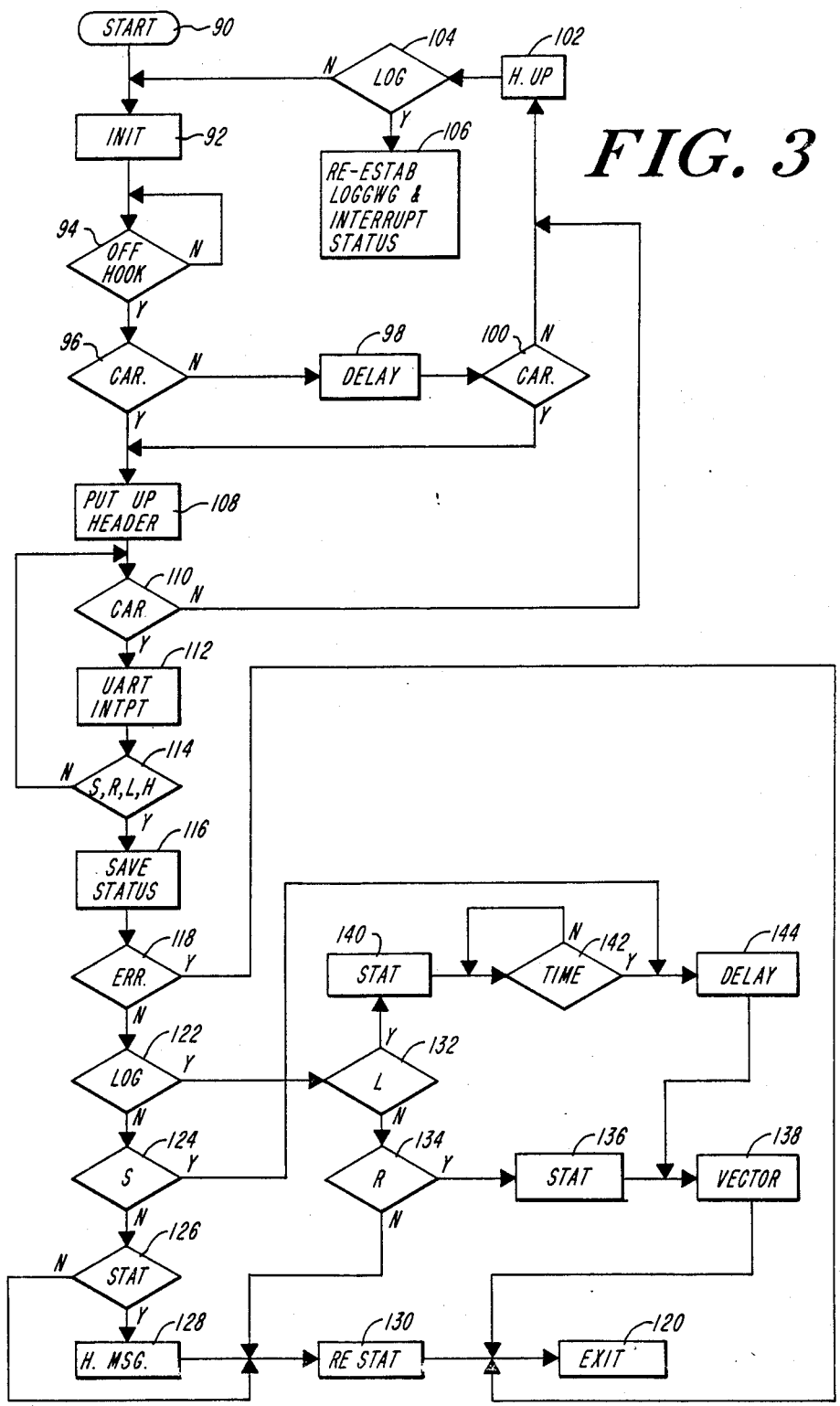

The computer 40 operates according to the flow charts of FIGS. 2 and 3 to accomplish data logging and readout as well as other control functions sent it from the base station 12. Computer 40 is normally in the processing states identified in FIG. 2, but will switch to the steps of FIG. 3 in response to an interrupt such as a ring signal activating the modem 38 or a command sent from the base station 12. In this normal processing state, the computer steps from a start state 62 through an initialization state 64 to a decision state 66. Processing branches in state 66 to either normal data aquisition or logging if a status bit is not set or to data readout if the status bit is set. In the aquisition steps, the system first provides a header in storage memory to identify the data in a step 68 and then proceeds through an initialization step 70 to a data recording step 72. A subsequent decision step 74 checks for completion of all data aquisition and if complete proceeds to a wait state 76. If data aquistion is not complete, the system cycles through a time delay state 78, waiting for the next time interval to pass before the next data logging at step 72. Several intervals are selectable on command as described below.

In the case where the system is in a readout mode, processing branches in state 66 to a step 80 which prepares an identifying header. Data is then readout in a step 82 which loops with itself through a step 84 until the memory is emptied. The processing then proceeds through a hang-up step 86 to wait state 76.

When a ring signal or command signal is detected, the processing transitions to FIG. 3 to a start state 90 followed by an initialization step 92 and off-hook signal detect step 94 which loops with itself until detection is achieved. A subsequent step 96 tests for the presence of a carrier signal. If not present from the wireless link, processing branches through a delay 98 to test again for carrier in a step 100. If carrier is still absent, then the system hangs up in step 102 and enters decision 104 to check for the presence of a status bit indicating logging was in process in which case processing goes to step 106 which reestablishes the logging processing of FIG. 2 at the point where it was left. Otherwise processing returns to step 92.

If carrier was detected in step 96 header data is set in subsequent step 108 and a further test for carrier made in step 110 from which a negative result transitions to step 102. If carrier is still present in step 110, then processing proceeds to a step 112 which sets a modem interrupt and proceeds to a decision step 114 looking for a logging start (S), state reset (R), readout (L), or help (H) command and loops back through step 110 until it is received. Once one such command is received, that command is saved in step 116 and processing proceeds to a step 118 which checks for error or inappropriate data, conditions or password or code deficiency and if present exits to state 120. If there is no error, a subsequent step 122 tests the type of status and if neither read or reset, it branches to decision 124 to test if the command was a start. If not, processing proceeds through status decision for a help message and either provides it or not in respective steps 126 and 128, exiting through a status restoration step 130.

If state 122 determined that a read or reset command had been received, processing branches to a decision step 132 to test for the read command. If not present a subsequent test step 134 checks for the receipt of the reset message. Again if not present, the system transitions to the restore status step 128. If there was a reset command, then processing goes to step 136 which resets the system and transitions through a vector start step 138 that executes the requisite vector jump before exiting. If there is a read command from step 132 processing goes through a status set step 140 for that command and then waits for time out of a set interval and proceeds in step 142, along with the positive determination from step 124, to set the time delays between logging in step 144. From step 144 processing proceeds through the vector jump 138.

The system described above is thus capable of sophistocated remote data logging and read out through the use of a low cost cordless phone set. The description is only exemplary, the scope of the invention coming solely from the following claims.

The system may be additionally operative in the transition from state 72 to state 74 to test in a state 71 for the existence of an alarm condition such as an environmental parameter being outside a predetermined range. If there is no such condition processing continues in step 74. With the presence of an alarm condition the system branches to a state 73 which instructs the cordless phone 20 to execute an automatic dialing of a preselected number and to proceed through a handshake step 75 to a step 77 where an alarm signal is fed to the distant receiving phone station where manual or computer response is taken.

We claim:

1. In a system for the remote logging of information and communication thereof via a wireless telephone communication link to a base station, a remote control system for interfacing the logging system and wireless telephone link comprising:

means responsive to a ring indication from the wireless telephone for identifying to the remote logging system an indication of a transmission from the base station;

means responsive to an on/off-hook signal from the remote logging system for enabling said wireless telephone to provide two-way signal transmission and reception with said base station; and means for coupling two-way wireless communication between said wireless telephone and said remote logging system.

2. The system of claim 1 further including means for latching and unlatching said identifying means as a function of said on/off-hook signal.

3. The system of claim 1 further including means for disabling the ring indication as a function of said on/off-hook signal.

4. The system of claim 1 wherein said coupling means includes an acoustic coupler.

5. The system of claim 1 wherein said coupling means includes a direct signal link.

6. The system of claim 1 wherein said wireless telephone includes a "cordless" telephone.

7. The system of claim 1 wherein said wireless telephone includes a cellular telephone.

8. The system of claim 1 wherein said base station further includes means for generating signals for transmission to said wireless telephone indicative of commands to log data, read data, and alter data logging protocols.

9. The system of claim 1 wherein said base station further includes a processor for receiving logged data transmitted by said wireless telephone.

10. The system of claim 1 wherein said remote logging system further includes sensors for detection of one or more environmental paramenters and means for locally recording the sensed parameters at said logging means.

11. The system of claim 10 further including means for responding to a signal from said wireless telephone for reading to said wireless telephone locally recorded sensed parameters.

12. The system of claim 10 further including means for responding to a signal from said wireless telephone to provide the local recording of sensed parameters according to a particular data aquisition protocol.

13. The system of claim 12 further including means for responding to a signal from said wireless telephone for adjusting the aquisition protocol.

14. In a system for the remote logging of information and communication thereof via a wireless telephone communication link to a base station, a remote control method for interfacing the logging system and wireless telephone link comprising:

responding to a ring indication from the wireless telephone for identifying to the remote logging system an indication of a transmission from the base station;

responding to an on/off-hook signal from the remote logging system for enabling said wireless telephone to provide two-way signal transmission and reception with said base station; and coupling two-way wireless communication between said wireless telephone and said remote logging system.

15. The method of claim 14 further including latching and unlatching said identifying means as a function of said on/off-hook signal.

16. The method of claim 14 further including disabling the ring indication as a function of said on/off-hook signal.

17. The method of claim 14 wherein said coupling step includes acoustically coupling.

18. The method of claim 14 wherein said coupling step includes direct signal coupling.

19. The method of claim 14 further including generating signals for transmission to said wireless telephone indicative of commands to log data, read data, and alter data logging protocols.

20. The method of claim 14 further including receiving logged data transmitted by said wireless telephone at said base station.

21. The method of claim 14 wherein said remote logging system further includes sensing one or more environmental paramenters and locally recording the sensed parameters at said logging means.

22. The method of claim 21 further including responding to a signal from said wireless telephone for reading to said wireless telephone locally recorded sensed parameters.

23. The method of claim 21 further including responding to a signal from said wireless telephone to provide the local recording of sensed parameters according to a particular data aquisition protocol.

24. The method of claim 23 further including responding to a signal from said wireless telephone for adjusting the aquisition protocol.

25. The system of claim 1 further including means for coupling the base station to a telephone network for distant activation of the remote logging system.

26. The system of claim 1 further including means for causing said remote logging system to transmit via said wireless telephone an alarm indication in response to a sensed environmental parameter exceeding a limit.

* * * * *

UNITED STATES PATENT AND TRADEMARK OFFICE
CERTIFICATE OF CORRECTION

PATENT NO. : 4,914,686

DATED : April 3, 1990

INVENTOR(S) : William C. Hager, III, et al.

It is certified that error appears in the above-identified patent and that said Letters Patent is hereby corrected as shown below:

In Column 2, line 12, "AT and T" should read --AT&T--.

Signed and Sealed this

Sixteenth Day of June, 1992

Attest:

DOUGLAS B. COMER

*Attesting Officer*       *Acting Commissioner of Patents and Trademarks*